United States Patent
Park et al.

(10) Patent No.: US 9,185,362 B2
(45) Date of Patent: Nov. 10, 2015

(54) METHOD OF CONTROLLING NETWORK CAMERA

(71) Applicant: HANWHA TECHWIN CO., LTD., Changwon-Si (KR)

(72) Inventors: Mun-Jun Park, Changwon (KR); Ho-Jung Lee, Changwon (KR)

(73) Assignee: Hanwha Techwin Co., Ltd., Changwon-si (KR)

(*) Notice: Subject to any disclaimer, the term of this patent is extended or adjusted under 35 U.S.C. 154(b) by 0 days.

(21) Appl. No.: 14/053,681

(22) Filed: Oct. 15, 2013

(65) Prior Publication Data

US 2014/0375801 A1    Dec. 25, 2014

(30) Foreign Application Priority Data

Jun. 24, 2013    (KR) .................. 10-2013-0072710

(51) Int. Cl.
*H04N 5/232* (2006.01)
*H04N 7/18* (2006.01)

(52) U.S. Cl.
CPC ............... *H04N 7/183* (2013.01); *H04N 5/232* (2013.01)

(58) Field of Classification Search
CPC ............................................... H04N 5/23206
USPC .................. 348/211.8, 211.13, 211.99, 211.5
See application file for complete search history.

(56) References Cited

U.S. PATENT DOCUMENTS

| | | | |
|---|---|---|---|
| 6,822,676 B1 * | 11/2004 | Kurosawa et al. | 348/211.3 |
| 2007/0217519 A1 * | 9/2007 | Murayama et al. | 375/240.25 |
| 2013/0076918 A1 | 3/2013 | Park et al. | |
| 2014/0226024 A1 * | 8/2014 | Limbaugh et al. | 348/169 |

FOREIGN PATENT DOCUMENTS

| | | |
|---|---|---|
| JP | 2011-155584 A | 8/2011 |
| KR | 10-2010-0052722 A | 5/2010 |
| KR | 10-2012-0105201 A | 9/2012 |
| KR | 10-2013-0032776 A | 4/2013 |

* cited by examiner

*Primary Examiner* — Anthony J Daniels
(74) *Attorney, Agent, or Firm* — Sughrue Mion, PLLC

(57) ABSTRACT

Provided is a method of controlling an operation of a network camera that is capable of improving a delay time occurring when a monitoring device controls the network camera, by using a virtual image map and a multi-streaming technique. The method includes displaying a first view image; and performing a panning/tilting control operation, the performing the panning/tilting control operation including: displaying a first virtual image from a virtual image map; and replacing the first virtual image with a second view image.

12 Claims, 9 Drawing Sheets

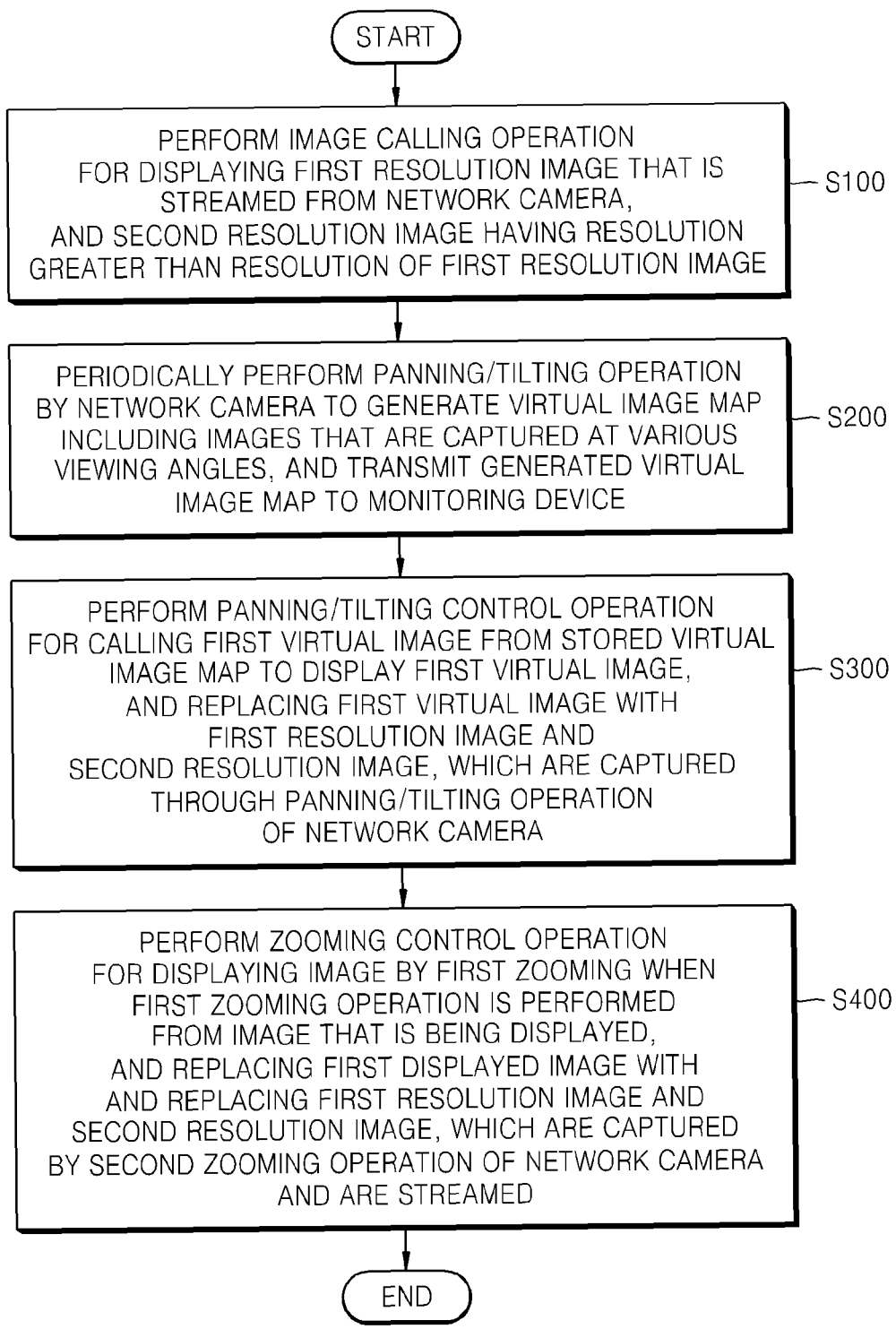

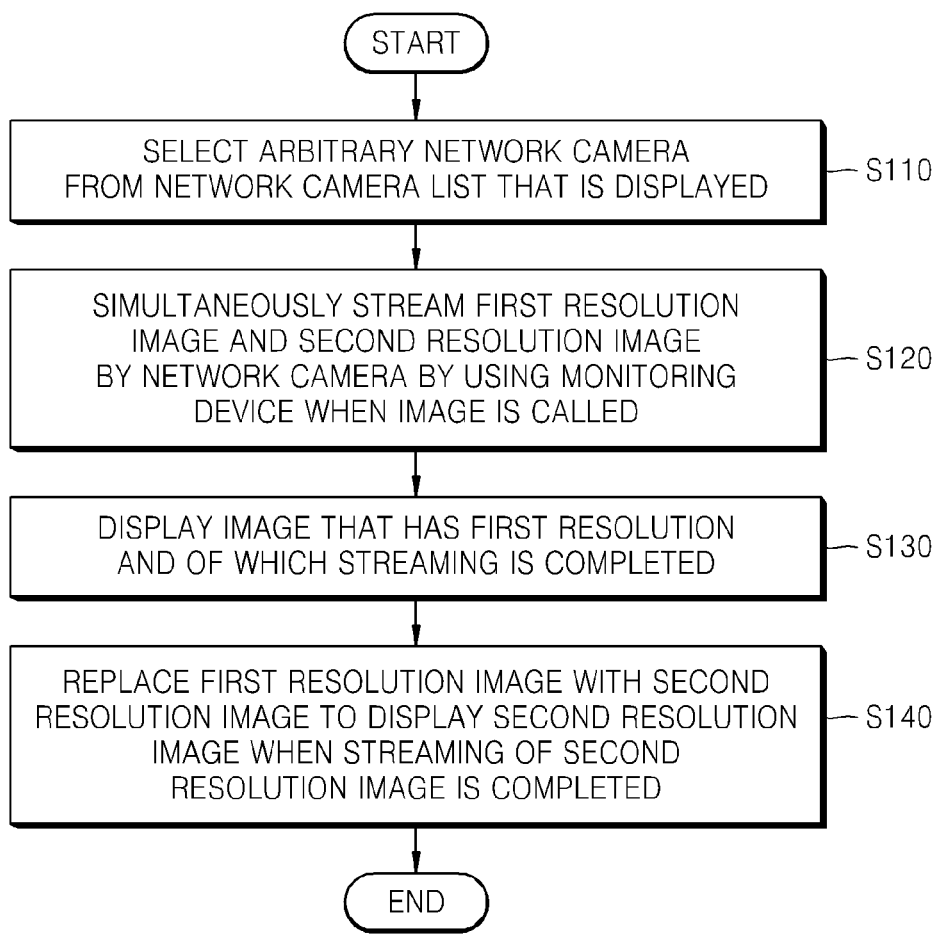

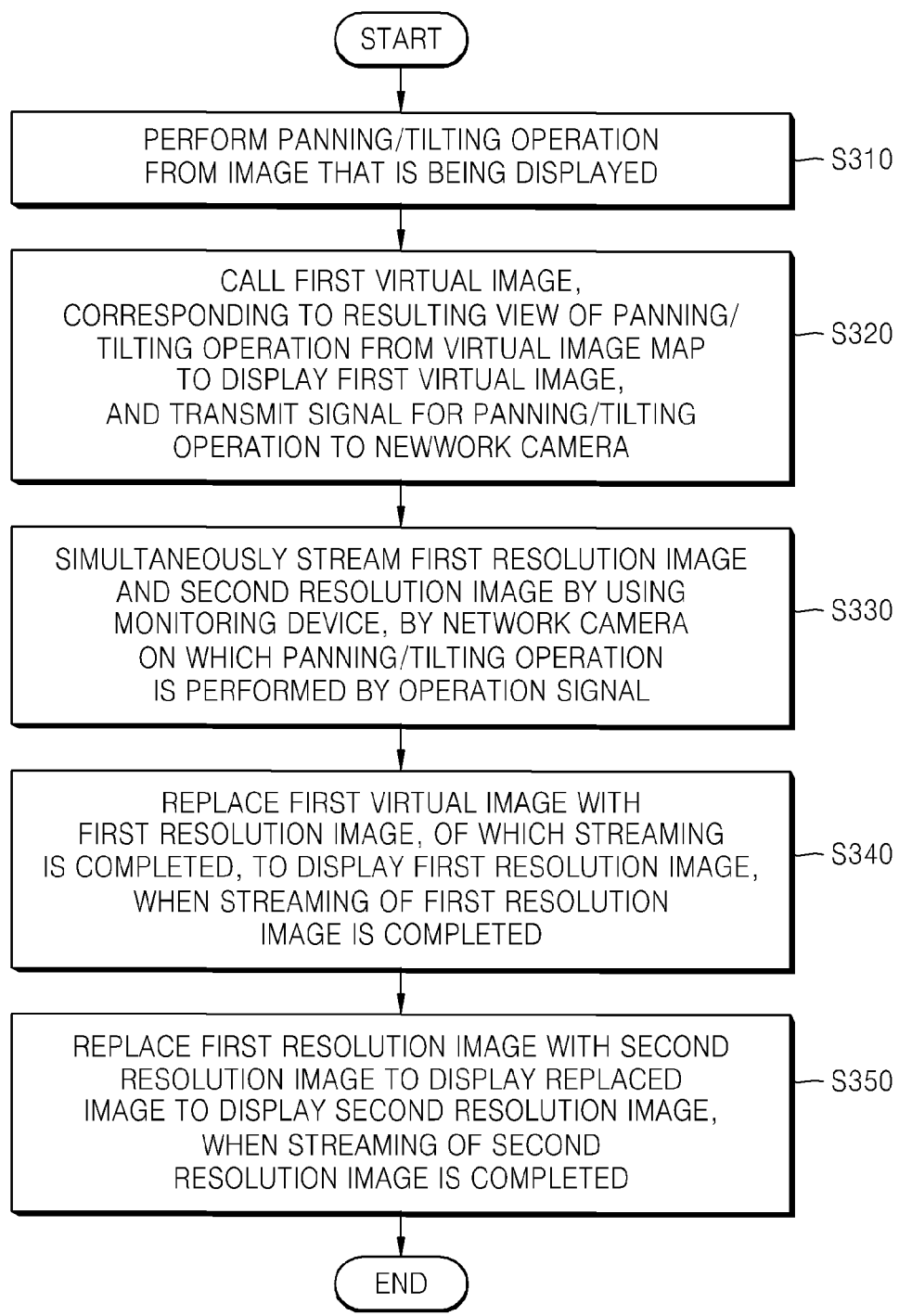

CURRENT
SCREEN 112-3

STREAMED
FIRST RESOLUTION
IMAGE

STREAMED
SECOND RESOLUTION
IMAGE

CURRENT
SCREEN 115-2

STREAMED
FIRST RESOLUTION
IMAGE

STREAMED
SECOND RESOLUTION
IMAGE

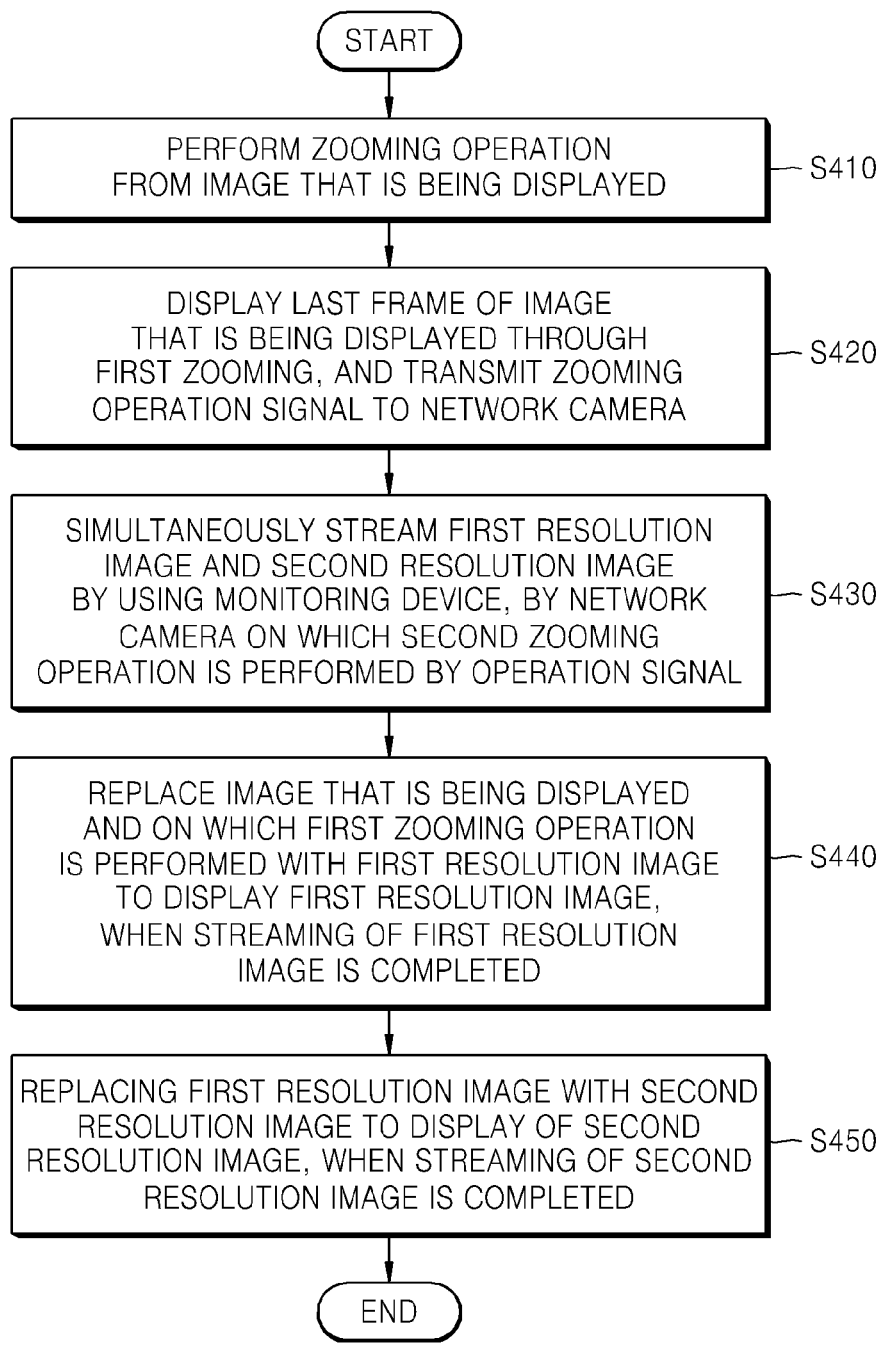

CURRENT SCREEN | LAST FRAME OF CURRENT SCREEN ON WHICH DIGITAL ZOOMING IS PERFORMED | FIRST RESOLUTION IMAGE ON WHICH OPTICAL ZOOMING IS PERFORMED TO BE STREAMED | SECOND RESOLUTION IMAGE ON WHICH OPTICAL ZOOMING IS PERFORMED TO BE STREAMED

METHOD OF CONTROLLING NETWORK CAMERA

CROSS-REFERENCE TO RELATED PATENT APPLICATION

This application claims priority from Korean Patent Application No. 10-2013-0072710, filed on Jun. 24, 2013 in the Korean Intellectual Property Office, the disclosure of which is incorporated herein by reference in its entirety.

BACKGROUND

1. Field

Methods consistent with exemplary embodiments relate to a method of controlling an operation of a network camera while monitoring an image captured by the network camera.

2. Description of the Related Art

In the related art, a technique of controlling a network camera by using a monitoring device uses a touch sensor or a gravity acceleration sensor. Korean Patent Publication No. 2013-0032776 and Korean Patent Publication No. 2010-0052722 disclose a method of controlling a camera by using a monitoring device, such as a mobile terminal. However, when the camera is controlled using such a monitoring device, there is a problem that an image according to a result of the controlling of the camera is not reflected in real time in the monitoring device and a delay time occurs, which results in inconvenience in controlling the camera.

SUMMARY

One or more exemplary embodiments provide a method of controlling a network camera that is capable of improving a delay time occurring when a monitoring device controls the network camera, by using a virtual image map and a multi-streaming technique.

According to an aspect of an exemplary embodiment, there is provided a method of controlling an operation of a network camera by using a monitoring device, the method including: displaying a first view image; and performing a panning/tilting control operation, the performing the panning/tilting control operation including: displaying a first virtual image from a virtual image map; and replacing the first virtual image with a second view image.

The second view image may include: a first panning/tilting resolution image; and a second panning/tilting resolution image having a different resolution than that of the first panning/tilting resolution image, wherein the first and second panning/tilting resolution images are configured to be captured in response to a completion of the panning/tilting operation of the network camera and are streamed from the network camera.

The first view image may include: a first current view resolution image that is streamed from the network camera; and a second current view resolution image that is streamed from the network camera and having a different resolution than that of the first current view resolution image.

The method may further include: generating the virtual image map comprising images captured at various viewing angles; and storing the generated virtual image map in the monitoring device.

The network camera may generate the virtual image map by periodically performing an automatic panning/tilting operation.

The displaying the first view image may include: selecting an arbitrary network camera from a network camera list; simultaneously streaming the first current resolution image and the second current resolution image in response to the first view image being called by a monitoring device; displaying the first current resolution image in response to the streaming of the first current view image being completed; and replacing the first current view resolution image with the second current view resolution image to display the second current view resolution image, in response to the streaming of the second current view resolution image being completed.

The displaying the first virtual image may include: performing the panning/tilting operation from the image that is being displayed; displaying the first virtual image, corresponding to a resulting view of the panning/tilting control operation, from the virtual image map; transmitting an operation signal corresponding to the panning/tilting control operation to the network camera; and simultaneously streaming the first panning/tilting resolution image and the second panning/tilting resolution image by the network camera on which the panning/tilting operation is performed according to the operation signal.

The replacing the first virtual image may include: replacing the first virtual image that is being displayed with the first panning/tilting resolution image to display the first panning/tilting resolution image, in response to the streaming of the first panning/tilting resolution image being completed; and replacing the first panning/tilting resolution image with the second panning/tilting resolution image to display the second panning/tilting resolution image, in response to the streaming of the second panning/tilting resolution image being completed.

The method may further include performing a zooming control operation, where the performing the zooming control operation may include: displaying a digital zoomed image resulting from a first zooming operation performed on the first or second view image; and replacing the digital zoomed image with a third view image.

The third view image may include: a first zooming resolution image; and a second zooming resolution image having a different resolution than that of the first zooming resolution image, wherein the first and second zooming resolution images are configured to be captured in response to a completion of a second zooming operation of the network camera and are streamed from the network camera.

The displaying the digital zoomed image may include: performing the zooming control operation on the first or second view image that is being displayed; displaying the digital zoomed image corresponding to a zoomed image of a last frame of the displayed image; transmitting a zooming operation signal to the network camera; and simultaneously streaming the first zoomed resolution image and the second zoomed resolution image by the network camera on which the second zooming operation is performed by the operation signal;

The replacing the digital zoomed image may include: replacing the digital zoomed image with the first zoomed resolution image to display the first zoomed resolution image, in response to the streaming of the first zoomed resolution image being completed; and replacing the first zoomed resolution image with the second zoomed resolution image to display the second zoomed resolution image, in response to the streaming of the second zoomed resolution image being completed.

The first zooming operation may include a digital zooming operation and the second zooming operation may include an optical zooming operation.

BRIEF DESCRIPTION OF THE DRAWINGS

The above and/or other features and advantages of the disclosure will become more apparent by describing in detail exemplary embodiments thereof with reference to the attached drawings in which:

FIG. 2 is a flowchart illustrating a method of controlling a network camera according to an exemplary embodiment;

FIG. 3 is a flowchart illustrating an image calling method in FIG. 2 according to an exemplary embodiment;

FIG. 5 is a flowchart illustrating a panning/tilting control method in FIG. 2 according to an exemplary embodiment;

FIG. 7 is a flowchart illustrating a zoom control method in FIG. 2 according to an exemplary embodiment.

DETAILED DESCRIPTION

Figure 1:
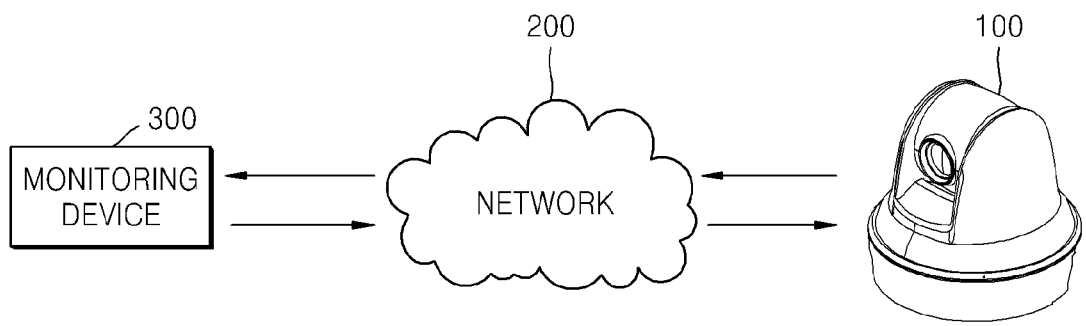
FIG. 1 is a diagram showing a network camera control system.

Hereinafter, Reference will now be made in detail to the exemplary embodiments, examples of which are illustrated in the attached drawings. Like reference numerals in the drawings denote like elements, and thus their description will be omitted.

FIG. 1 is a diagram showing a network camera control system.

Referring to FIG. 1, the network camera control system includes a network camera 100, a network 200, and a monitoring device 300.

The network camera 100 may be configured as a single fixed camera that includes a fixed lens and has a fixed imaging range, or may be configured as a pan-tilt-zoom (PTZ) camera having a variable imaging range. Here, the PTZ camera may easily change various monitoring regions using one camera by a panning operation in which the PTZ camera is rotated in a horizontal direction, a tilting operation in which the PTZ camera is rotated in a vertical direction, and a zoom-in/zoom-out operation. The PTZ camera may be moved in the horizontal and vertical direction and may be rotated, as compared with the single fixed camera, and thus there is an advantage that the PTZ camera may sense all directions and has a uniform resolution. The network camera 100 is connected to the monitoring device 300, and a monitoring function of the network camera 100 is controlled by a command from the monitoring device 300.

The monitoring device 300 may be a device capable of executing a web viewer, or may be a mobile device capable of executing a mobile viewer. In addition, the monitoring device 300 may be a network video recorder (NVR) including a viewer embedded therein, or may be a computer including a network camera control program.

The monitoring device 300 may include a display unit 310 as shown in FIG. 3 that displays an image captured by the network camera 100 through the network 200. The display unit 310 may be a touch panel, and may be formed as a liquid crystal display (LCD), an organic light-emitting diode (OLED) display, or the like. The display unit 310 may receive a control signal for controlling the network camera 100 and transmit the control signal to the network camera 100.

In the exemplary embodiment, the monitoring device 300 may perform image calling for displaying a first resolution image that is streamed from the network camera 100, and a second resolution image having a resolution greater than the resolution of the first resolution image. In addition, when a panning/tilting operation is performed from an image that is being displayed, the monitoring device 300 may call a first virtual image from a virtual image map that is previously stored to display the first virtual image, may replace the first virtual image with the first resolution image and may replace the first resolution image with the second resolution image, which are captured through the panning/tilting operation and are streamed, to display the first resolution image and the second resolution image. Further, when a first zooming operation is performed from an image that is being displayed, the monitoring device 300 may perform a zooming control for displaying the image generated by a first zooming operation and replacing the image generated by the first zooming operation with the first resolution image and replacing the first resolution image with the second resolution image, which are captured by a second zooming operation of the network camera 100, to display the first resolution image and the second resolution image.

Hereinafter, a method of controlling the network camera 100 of the monitoring device 300 will be described with reference to FIGS. 2 to 8.

FIG. 2 is a flowchart illustrating a method of controlling the network camera 100 according to an exemplary embodiment. Referring to FIG. 2, the monitoring device 300 performs an image calling operation (operation S100) for displaying a first resolution image that is streamed from the network camera 100, and a second resolution image that is streamed from the network camera 100 and having a resolution greater than the resolution of the first resolution image.

Figure 4A:
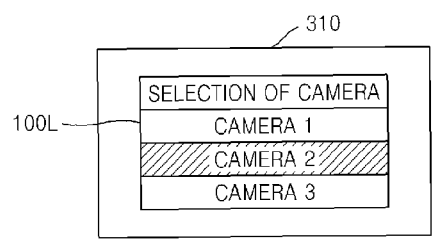
FIGS. 4A to 4C are diagrams illustrating image calling of the related art.
Figure 4B:
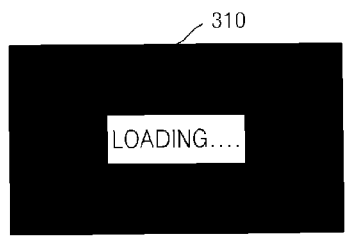
Figure 4C:
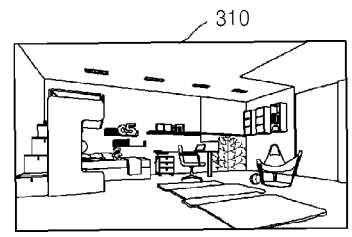
Figure 4D:
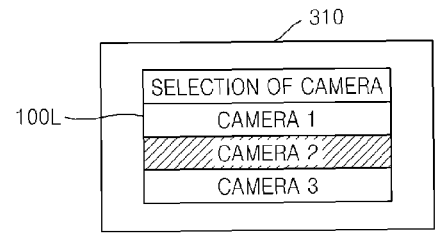
FIGS. 4D to 4F are diagrams illustrating the image calling method in FIG. 2 according to an exemplary embodiment.
Figure 4E:
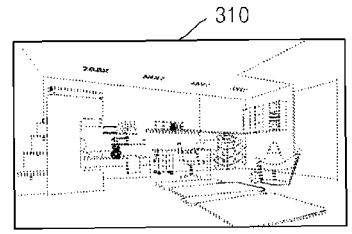
Figure 4F:
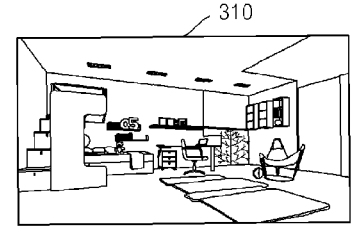

FIG. 3 is a flowchart illustrating an image calling method in FIG. 2 according to an exemplary embodiment. FIGS. 4A to 4C are diagrams illustrating image calling of the related art, while FIGS. 4D to 4F are diagrams illustrating the image calling method in FIG. 2 according to an exemplary embodiment. Referring to FIG. 3, the monitoring device 300 performs an operation for selecting an arbitrary network camera 100 from a network camera list that is displayed (operation S110).

When the selection of the arbitrary network camera 100 is completed, the monitoring device 300 calls an image from the selected network camera 100, and the network camera 100 performs an operation for simultaneously streaming the first resolution image and the second resolution image (operation S120) of the called image. Here, the first resolution may refer to a low resolution, for example, equal to or less than 320× 240, the second resolution may be a standard resolution or a high resolution that is equal to or greater than the first resolution, for example, 2M or 5M, or may be a resolution that is set by a user. Thus, it may be seen that the first resolution image has a streaming speed that is far higher than that of the second resolution image.

An operation for displaying the first resolution image of which the streaming is completed is performed on the first resolution image and the second resolution image which are streamed (operation S130).

Thereafter, when the streaming of the second resolution image is completed during the displaying of the first resolution image, the monitoring device 300 performs an operation of replacing the first resolution image that is being displayed with the second resolution image to display the second resolution image (operation S140).

Referring to FIG. 3, when the monitoring device 300 monitors an image captured by the network camera 100, the image captured by the network camera 100 may be viewed by first displaying the streamed first resolution image with the low resolution image so as to reduce the time for which the image that is initially captured by the network camera 100 is transmitted to the monitoring device 300. Then, when the streaming of the second resolution image having a resolution that is equal to or greater than the first resolution is completed, the monitoring device 300 replaces the first resolution image with the second resolution image to display the second resolution image. Thus, a user may monitor a seamless image in which a delay time is minimized. In addition, when a streamed image has a resolution lower than a resolution that is designated by a user due to the unstable monitoring device 300, the monitoring device 300 automatically requests the network camera 100 to change an image having a low resolution so as to allow the user to monitor a seamless image.

FIGS. 4A to 4C are diagrams illustrating image calling of the related art. FIG. 4A is a diagram illustrating a result of selecting an arbitrary network camera (camera 2) from a displayed network camera list 100L by the monitoring device 300. FIG. 4B is a diagram showing a display unit 310 of the monitoring device 300 which is shown in black during a time when the network camera (camera 2) is being connected to the monitoring device 300 and then an image captured by the selected network camera (camera 2) is displayed after delay time. In this case, a user may erroneously think that there is a malfunction in the network camera 100, and the delay time may cause the user to feel concerned or irritated. FIG. 4C is an image of the network camera (camera 2) that is displayed on the monitoring device 300 after the delay time.

However, FIGS. 4D to 4F are diagrams illustrating image calling according to the exemplary embodiment. FIG. 4D is a diagram illustrating a result of selecting an arbitrary network camera (camera 2) from a displayed network camera list 100L by the monitoring device 300. FIG. 4E is an image showing a first resolution image captured by the network camera (camera 2) that is connected to the monitoring device 300. Since the first resolution image is an image having a low resolution, the first resolution image may be immediately streamed to the monitoring device 300 to be displayed. Thus, a delay time may be minimized. FIG. 4F is an image showing the first resolution image that is replaced with a second resolution image, of which the streaming is completed, to be displayed. Therefore, a user may monitor an image in which a delay time is minimized, and a seamless image from the first resolution image to the second resolution image.

Figure 6A:
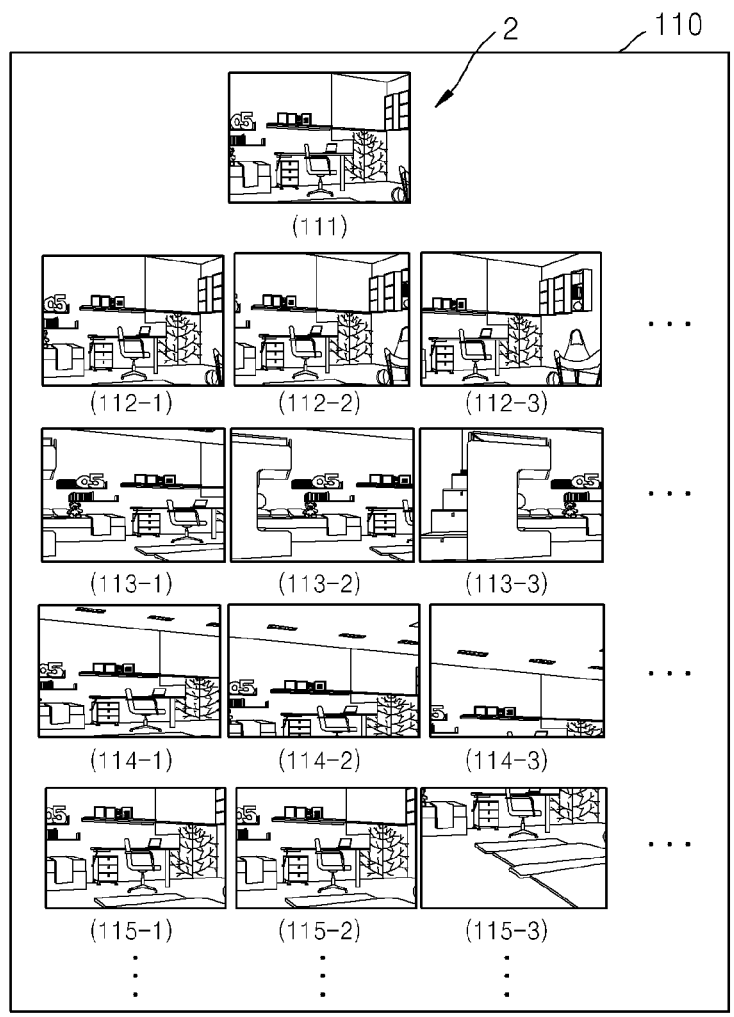
FIGS. 6A to 6I are diagrams illustrating the panning/tilting control method in FIG. 2 according to an exemplary embodiment.

Referring back to FIG. 2, after such image calling is completed, the network camera 100 generates a virtual image map including images that are captured at various viewing angles by periodically performing a panning/tilting operation and transmits the generated virtual image map to the monitoring device 300, and the monitoring device 300 performs an operation of storing the transmitted virtual image map (operation S200). FIG. 6A shows a virtual image map 110 that is generated by the network camera 100 and is transmitted to the monitoring device 300. When there is no user who is connected to the network camera 100, the virtual image map 110 may be generated as an aggregation of images captured at various viewing angles by periodically performing a panning/tilting operation. The virtual image map 110 shown in FIG. 6A includes images 112 to 115 captured at various viewing angles based on an image 111 that is captured in the current view. In addition to each of the images 112 to 115 captured at various viewing angles, the monitoring device 300 may store the corresponding panning coordinate or tilting coordinate of the network camera 100 with respect to the each of the images 112 to 115 captured at various viewing angles.

When a panning/tilting operation is performed from an image (for example, the image shown in FIG. 4F) which is being displayed after the monitoring device 300 receives and stores the virtual image map 110, the monitoring device 300 calls a first virtual image from the stored virtual image map 110 to display the first virtual image which matches a resulting image of the performed panning/tilting operation, performs a panning/tilting control operation, replace the first virtual image with a first resolution image and consequently replace the first resolution image with a second resolution image, where the first and second resolution images are captured through an actual panning/tilting operation, to display the first and second resolution images (operation S300).

FIG. 5 is a flowchart illustrating a panning/tilting control operation in FIG. 2 according to an exemplary embodiment. Referring to FIG. 5, the monitoring device 300 performs an operation of performing a panning/tilting operation from an image that is being displayed (operation S310). Here, the image that is being displayed may be, for example, the image shown in FIG. 4F, which is displayed through image calling, or may be the current view of the network camera 100. Here, the panning/tilting operation may be performed by a user touching the display unit 310 of the monitoring device 300, may be performed using a gravity acceleration sensor (not shown), or may be performed by inputting a button (not shown) which is included in the monitoring device 300.

When the panning/tilting operation is performed to the displayed image through the touching, the gravity acceleration sensor, or the inputting of the button, the monitoring device 300 performs an operation of calling a first virtual image, which matches a resulting image of the performed operation, from the virtual image map to display the first virtual image, and transmitting an operation signal to the network camera 100 (operation S320). In the exemplary embodiment, the first virtual image refers to an image that is changed from an image captured to a state where a user performs a panning operation twice to the right, from the virtual image map 110 that is previously stored in the monitoring device 300, and then the first virtual image may be called to be displayed. When the user performs a tilting operation once in a downward direction by using the same method, an image captured to a state where the tilting operation is performed once in a downward direction, from the virtual image map 110 that is previously stored in the monitoring device 300, is changed to the first virtual image, and is then called to be displayed. In addition, here, the operation signal of the network camera 100 may be a panning/tilting coordinate value of the network camera 100 which is actually input by the user.

When the transmission of the operation signal to the network camera 100 is completed in a state where the first virtual image is being displayed, the network camera 100 performs an actual panning/tilting operation by the operation signal, that is, the panning/tilting coordinate value, and the network camera 100 performs an operation of simultaneously streaming the first resolution image and the second resolution image (operation S330). Here, the first resolution may refer to a low resolution, for example, equal to or less than 320×240, and the second resolution may be a standard resolution or a high resolution that is equal to or greater than the first resolution, for example, 2M or 5M, or may be a resolution that is set by a user. Thus, it may be seen that the first resolution image has a streaming speed that is far higher than that of the second resolution image.

When the streaming of the first resolution image is completed with respect to the first resolution image and the second resolution image which are streamed, the monitoring device 300 performs an operation of replacing the first virtual image that is being displayed with the first resolution image, of which the streaming is completed, to display the first resolution image (operation S340).

When the streaming of the second resolution image is completed during the displaying of the first resolution image, the monitoring device 300 performs an operation of replacing the first resolution image that is being displayed with the second resolution image to display the second resolution image (operation S350).

Figure 6B:
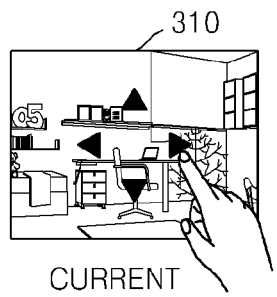
Figure 6C:
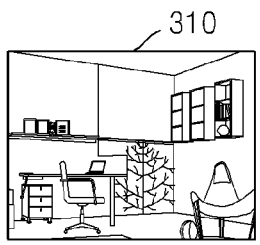
Figure 6D:
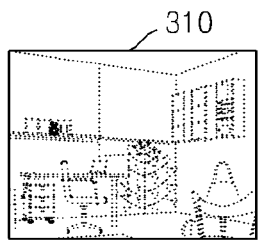
Figure 6E:
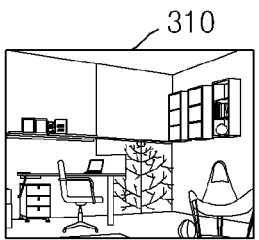

For convenience of description, the virtual image map 110 (see FIG. 6A) and a panning/tilting control screen (see FIGS. 6B to 6I) will be described with reference to FIG. 6. FIGS. 6B to 6I are diagrams illustrating a panning control. FIG. 6B is a diagram in which a user performs a panning operation twice to the right on the current screen displayed on the display unit 310. That is, the user presses a right arrow on the display unit 310 twice. FIG. 6C is a diagram in which an image 112-3 of the virtual image map 110 captured at a state which matches a state where the user performs a panning operation twice to the right is called as the first virtual image to be displayed. FIG. 6D is a diagram in which the streaming of the first resolution image, which is captured after actually performing the panning operation described above by the network camera 100, is completed, and then the first virtual image being replaced with the first resolution image to be displayed. FIG. 6E is a diagram in which the streaming of the second resolution image is completed while the first resolution image is displayed, and then the first resolution image is replaced with the second resolution image to be displayed.

Figure 6F:
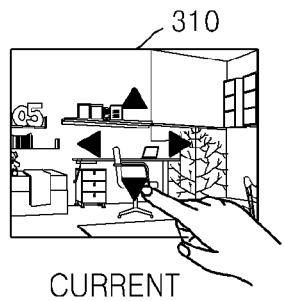
Figure 6G:
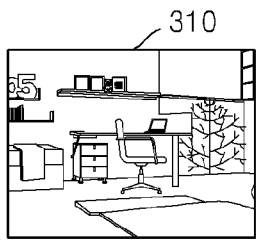
Figure 6H:
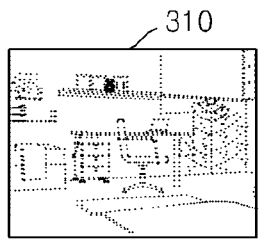
Figure 6I:
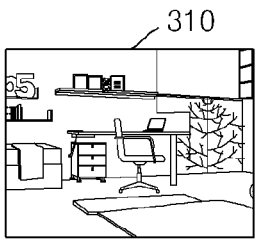

Similarly, FIGS. 6F to 6I are diagrams illustrating a tilting control. FIG. 6F is a diagram in which a user performs a tilting operation once in the downward direction on the current screen displayed on the display unit 310. FIG. 6G is a diagram in which an image 115-2 of the virtual image map 110 captured at a state which matches a state where a tilting operation is performed once in the downward direction, is called as the first virtual image to be displayed. FIG. 6H is a diagram in which the streaming of the first resolution image, which is captured after performing the tilting operation by the network camera 100, is completed, and then the first virtual image is replaced with the first resolution image to be displayed. FIG. 6I is a diagram in which the streaming of the second resolution image is completed while the first resolution image is displayed, and then the first resolution image is replaced with the second resolution image to be displayed.

Thus, a user may control the panning/tilting operation of the network camera 100 while monitoring a seamless image in which a delay time is minimized, by using the monitoring device 300.

Referring back to FIG. 2, when the panning/tilting operation is performed from an image that is being displayed after the panning/tilting control is completed, the monitoring device 300 performs a zooming control operation (operation S400) by displaying the image generated by a first zooming operation, replacing the generated displayed image with the first resolution image and consequently replacing the first resolution image with the second resolution image, where the first and second resolution images are captured by a second zooming operation of the network camera 100 and are streamed, to display the first and second resolution images.

Here, the first zooming may refer to a digital zooming, and the second zooming may refer to an optical zooming by the network camera 100. In the current exemplary embodiment, a description has been made of a case where the panning/tilting control operation (operation S300) and the zooming control operation (operation S400) are sequentially performed. However, the exemplary embodiment is not limited thereto, and any one operation of the above-mentioned operations may be first performed, and the other operation may be performed after.

FIG. 7 and FIGS. 8A to 8D are respectively a flowchart and images illustrating a zooming control operation in detail according to an exemplary embodiment. Referring to FIG. 7, the monitoring device 300 performs a zooming operation from an image that is being displayed (operation S410). Here, the image that is being displayed may be, for example, the image shown in FIG. 4F which is displayed through image calling, or may be the current view of the network camera 100. Here, the zooming operation may be performed by a user touching the display unit 310 of the monitoring device 300, may be performed using a gravity acceleration sensor (not shown), or may be performed by inputting a button (not shown) which is included in the monitoring device 300.

When the zooming operation is performed through the touching, the gravity acceleration sensor, or the inputting of the button, the monitoring device 300 performs an operation of a first zooming operation, i.e. digital zooming, on the last frame of an image that is being displayed to display the last frame of the image and performs an operation of transmitting an operation signal to the network camera 100 (operation S420). Here, the operation signal of the network camera 100 may be a zooming coordinate value of the network camera 100, which is actually input by the user.

When the transmission of the operation signal to the network camera 100 is completed in a state where the image on which the first zooming operation, i.e. digital zooming, is performed is being displayed, the network camera 100 performs an operation of performing a second zooming operation according to the operation signal, that is, the zooming coordinate value and performs an operation of simultaneously streaming the first resolution image and the second resolution image (operation S430). Here, the first resolution may refer to a low resolution, for example, equal to or less than 320×240, and the second resolution may be a standard resolution or a high resolution that is equal to or greater than the first resolution, for example, 2M or 5M, or may be a resolution that is set by a user. Thus, it may be seen that the first resolution image has a streaming speed that is far higher than that of the second resolution image.

When the streaming of the first resolution image is completed with respect to the first resolution image and the second resolution image which are streamed, the monitoring device 300 replaces the displayed image that is generated by the first digital zooming operation with the first resolution image, of which the streaming is completed, to display the first resolution image (operation S440).

When the streaming of the second resolution image is completed during the displaying of the first resolution image, the monitoring device 300 replaces the first resolution image that is being displayed with the second resolution image to display the second resolution image (operation S450).

Figure 8A:
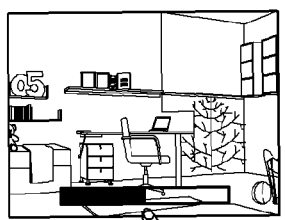
FIGS. 8A to 8D are images illustrating the zoom control method in FIG. 2 according to an exemplary embodiment.
Figure 8B:
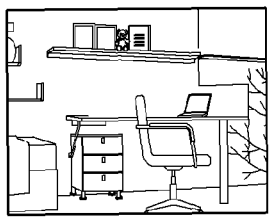
Figure 8C:
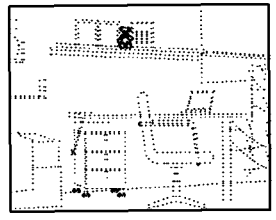
Figure 8D:
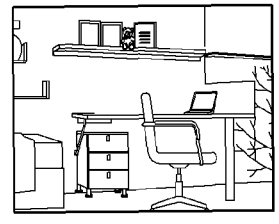

FIGS. 8A to 8D are images illustrating a zooming control. FIG. 8A is an image in which a user performs a zooming operation on the current screen displayed on the display unit 310. FIG. 8B is an image in which a first zooming, i.e. digital zooming, is performed on the last frame of an image that is being displayed. FIG. 8C is an image in which the streaming of the first resolution image, which is captured after actually performing a second zooming operation, i.e. optical zooming, by the network camera 100 in response to a zooming operation signal that is input by a user, is completed, and then the first zooming image is replaced with the first resolution image to be displayed. FIG. 8D is an image in which the streaming of the second resolution image is completed in a state where the first resolution image is displayed, and then the first resolution image is replaced with the second resolution image to be displayed.

Thus, a user may control the zooming operation of the network camera 100 while monitoring a seamless image in which a delay time is minimized, by using the monitoring device 300.

According to the present inventive concepts disclosed herein, a delay time that occurs when a monitoring device controls a network camera can be improved using a virtual image map and a multi-streaming technique.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A method of controlling an operation of a network camera by using a monitoring device, the method comprising:
   displaying a first view image; and
   performing a panning/tilting control operation, the performing the panning/tilting control operation comprising:
      displaying a first virtual image from a virtual image map; and
      replacing the first virtual image with a second view image, wherein the second view image comprises:
      a first panning/tilting resolution image; and
      a second panning/tilting resolution image having a different resolution than that of the first panning/tilting resolution image,
      wherein the first and second panning/tilting resolution images are configured to be captured in response to a completion of the panning/tilting operation of the network camera and are streamed from the network camera.

2. The method of claim 1, wherein the first view image comprises:
   a first current view resolution image that is streamed from the network camera; and
   a second current view resolution image that is streamed from the network camera and having a different resolution than that of the first current view resolution image.

3. The method of claim 1 further comprising:
   generating the virtual image map comprising images captured at various viewing angles; and
   storing the generated virtual image map in the monitoring device.

4. The method of claim 3, wherein the network camera generates the virtual image map by periodically performing an automatic panning/tilting operation.

5. The method of claim 2, wherein the displaying the first view image comprises:
   selecting an arbitrary network camera from a network camera list;
   simultaneously streaming the first current resolution image and the second current resolution image in response to the first view image being called by a monitoring device;
   displaying the first current resolution image in response to the streaming of the first current view image being completed; and
   replacing the first current view resolution image with the second current view resolution image to display the second current view resolution image, in response to the streaming of the second current view resolution image being completed.

6. The method of claim 1, wherein the displaying the first virtual image comprises:
   performing the panning/tilting operation from the image that is being displayed;
   displaying the first virtual image, corresponding to a resulting view of the panning/tilting control operation, from the virtual image map;
   transmitting an operation signal corresponding to the panning/tilting control operation to the network camera; and
   simultaneously streaming the first panning/tilting resolution image and the second panning/tilting resolution image by the network camera on which the panning/tilting operation is performed according to the operation signal.

7. The method of claim 6, wherein the replacing the first virtual image comprises:
   replacing the first virtual image that is being displayed with the first panning/tilting resolution image to display the first panning/tilting resolution image, in response to the streaming of the first panning/tilting resolution image being completed; and
   replacing the first panning/tilting resolution image with the second panning/tilting resolution image to display the second panning/tilting resolution image, in response to the streaming of the second panning/tilting resolution image being completed.

8. The method of claim 1, further comprising performing a zooming control operation, the performing the zooming control operation comprising:
   displaying a digital zoomed image resulting from a first zooming operation performed on the first or second view image; and
   replacing the digital zoomed image with a third view image.

9. The method of claim 8, wherein the third view image comprises:
   a first zooming resolution image; and
   a second zooming resolution image having a different resolution than that of the first zooming resolution image,
   wherein the first and second zooming resolution images are configured to be captured in response to a completion of a second zooming operation of the network camera and are streamed from the network camera.

10. The method of claim 9, wherein the displaying the digital zoomed image comprises:
    performing the zooming control operation on the first or second view image that is being displayed;
    displaying the digital zoomed image corresponding to a zoomed image of a last frame of the displayed image;
    transmitting a zooming operation signal to the network camera; and
    simultaneously streaming the first zoomed resolution image and the second zoomed resolution image by the network camera on which the second zooming operation is performed by the operation signal.

11. The method of claim 10, wherein the replacing the digital zoomed image comprises:
    replacing the digital zoomed image with the first zoomed resolution image to display the first zoomed resolution image, in response to the streaming of the first zoomed resolution image being completed; and replacing the first zoomed resolution image with the second zoomed resolution image to display the second zoomed resolution image, in response to the streaming of the second zoomed resolution image being completed.

12. The method of claim 9, wherein the first zooming operation comprises a digital zooming operation and the second zooming operation comprises an optical zooming operation.

\* \* \* \* \*